United States Patent
Guo et al.

(10) Patent No.: US 9,312,793 B2
(45) Date of Patent: Apr. 12, 2016

(54) BRAKE CONTROL CIRCUIT AND MOTOR SYSTEM

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Huixuan Guo, Beijing (CN); Honglin Miao, Beijing (CN); Yinlong Rui, Beijing (CN); Tao Sun, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/500,279

(22) Filed: Sep. 29, 2014

(65) Prior Publication Data

US 2015/0256109 A1    Sep. 10, 2015

(30) Foreign Application Priority Data

Mar. 7, 2014   (CN) .......................... 2014 1 0084132

(51) Int. Cl.
*H02K 7/10*    (2006.01)
*H02P 3/04*    (2006.01)

(52) U.S. Cl.
CPC ....................................... *H02P 3/04* (2013.01)

(58) Field of Classification Search
CPC ..................................... H02P 3/26; H02P 3/16
USPC ............... 318/56, 63, 86, 87, 400.01, 400.14, 318/700, 701, 727, 799, 800, 134, 400.09, 318/612, 614, 703, 741, 757, 759, 761, 273, 318/362, 363, 370, 371, 372, 375, 376, 318/432; 388/800; 188/24.14, 79.54; 180/244
See application file for complete search history.

(56) References Cited

U.S. PATENT DOCUMENTS

| 4,031,439 | A | | 6/1977 | Sakai et al. |
| 5,394,069 | A | * | 2/1995 | Danielson ................. H02P 3/26 318/371 |
| 6,051,894 | A | * | 4/2000 | Shimogama ......... H01H 47/002 307/125 |
| 8,736,219 | B2 | * | 5/2014 | Hofmann ............... B25J 9/1674 318/375 |

FOREIGN PATENT DOCUMENTS

| CN | 101367479 A | 2/2009 |
| CN | 201393193 Y | 1/2010 |
| CN | 201528302 U | 7/2010 |

OTHER PUBLICATIONS

First Office Action dated Oct. 30, 2015 corresponding to Chinese application No. 201410084132.7.

* cited by examiner

*Primary Examiner* — Antony M Paul
(74) *Attorney, Agent, or Firm* — Nath, Goldberg and Meyer; Joshua B. Goldberg

(57) ABSTRACT

The present invention relates to a brake control circuit and a motor system. The brake control circuit is used for controlling a motor brake connected to a motor, and comprises a brake control input module and a brake control main module, wherein the brake control input module includes a control signal input unit and N relays connected in parallel to an output end of the control signal input unit, the relays are electrically connected to the brake control main module, and N is an integer greater than or equal to 2.

20 Claims, 2 Drawing Sheets

BRAKE CONTROL CIRCUIT AND MOTOR SYSTEM

FIELD OF THE INVENTION

The present invention relates to the technical field of automatic control, and particularly to a brake control circuit and a motor system.

BACKGROUND OF THE INVENTION

Motor, as a power producer, is widely applied in the field of automatic control technology. For example, motors are used as drivers for shafts in robots and robotic arms used in a variety of industries, such as TFT-LED display, automobile and the like. To ensure that a robot or a robotic arm can carry out predetermined actions, a drive circuit is needed to bring the motor which drives the robot or the robotic arm into operation, and a brake control circuit is needed to stop the motor from operating.

FIG. 1 illustrates a motor brake control circuit commonly used in the prior art, which comprises a brake control input module 100 and a brake control main module 200. A control signal input unit 110 in the brake control input module 100 is used to introduce an external control signal from the outside and output a brake control signal in case of an external control signal. In the brake control main module 200, a brake control output unit 230 is used to output a brake signal to a motor brake (not shown), and a power input unit 210 is used to import a power signal which, under the control of the brake control input module 100, is transmitted to the brake control output unit 230 after rectified by a rectifying circuit 220 (a half-wave rectifying circuit in FIG. 1) and then transmitted to the motor brake via the brake control output unit 230, so as to stop the motor.

In the control process of a motor, in the case of normal operation, the output end of the control signal input unit 110 is at a high level (i.e. no brake control signal) so that normally open contacts of a relay 120 are closed. Therefore, the power signal introduced from the power input unit 210 is output to the motor brake via the brake control output unit 230 after rectified by the rectifying circuit 220 as a maintaining voltage indicating no need of brake, and thus the motor brake is not activated and the motor is not locked. In the case that the power is off or an emergency stop button is pressed, the control signal input unit 110 connected to the outside generates a brake control signal of low level at its output end according to the received power-off signal or the emergency stop signal. Accordingly, the commonly open contact of the relay 120 is open, the power signal is cut off, and no voltage is output from the brake control output unit 230. In this way, the motor brake works to lock the motor.

As shown in FIG. 1, the rectifying unit 220 is generally formed by a plurality of discrete components. When aging, damage or failure happens to one of these components in the rectifying unit 220, the brake control output unit 230 cannot output the maintaining voltage. As a result, the motor brake is mistakenly activated to lock the motor, and thereby the robot or the robotic arm cannot operate properly. When such malfunction occurs, one currently-adopted solution is replacing the whole brake control board, which is costly. Another solution is disassembling and replacing the rectifying unit 220 or repairing the rectifying unit 220, which is cumbersome and time-consuming, as the component(s) causing this malfunction needs to be found out, thus extending downtime and increasing production cost.

Meanwhile, in FIG. 1, in the case of unstable peak voltage of the power signal, frequent use of the relay, exception/failure of components, and end of service life of selected components, the following situations may occur: in need of braking, the commonly open contacts of the relay 120 cannot be open promptly or all along, which disables the maintaining voltage at the brake control output unit 230 from disconnecting, and causes malfunction of the motor brake, and thus the motor cannot be locked. This may bring harm to personal safety of an equipment user and may cause loss to the production.

In order to avoid the above situations, currently, it becomes an urgent task to design a motor brake control circuit which is of high brake reliability and convenient for maintenance.

SUMMARY OF THE INVENTION

In view of the above problems existing in the prior art, the present invention provides a brake control circuit and a motor system, and the brake control circuit has high reliability and is convenient for maintenance.

An technical solution of the present invention is a brake control circuit for controlling a motor brake connected to a motor, which comprises a brake control input module and a brake control main module used to control the motor brake to start or stop under the control of the brake control input module, wherein the brake control input module includes a control signal input unit and N relays connected in parallel to an output end of the control signal input unit, the control signal input unit is used to collect a power-off signal or receive an emergency stop signal, generate a brake control signal according to the collected power-off signal or the input emergency stop signal, and transmit the generated brake control signal to the relays, the relays are electrically connected to the brake control main module, and are used to control an output of the brake control main module according to the brake control signal received from the control signal input unit, and N is an integer greater than or equal to 2.

Further, the brake control main module comprises a power input unit, a rectifying unit and a brake control output unit which are electrically connected in sequence, an output end of the brake control output unit is electrically connected to an input end of the motor brake, and coils of the N relays are connected in parallel to the output end of the control signal input unit, and contacts of the N relays are connected in series between the power input unit and the rectifying unit.

Further, contacts of at least one relay are provided at each of a positive output end and a negative output end of the power input unit.

Further, a fuse is provided between each of the positive output end and the negative output end of the power input unit and the contacts of the relay corresponding thereto.

Further, the contacts of the relay are commonly open contacts.

Further, a free-wheeling diode is connected in parallel between an output end of the rectifying unit and an input end of the brake control output unit.

Further, the rectifying unit is a plug-in module.

Further, the N relays are of the same type.

Further, the brake control circuit adopts a bilayer wiring design.

The present invention further provides a motor system, comprising a motor, a motor brake connected to the motor, and a brake control circuit for controlling the motor brake, wherein, the brake control circuit is the above-described brake control circuit.

The beneficial effects of the brake control circuit of the present invention are as follows. With the modular design for the rectifying unit, not only is reliability improved, but also replacement is facilitated; with the design of connecting the coils of multiple relays in parallel and connecting the contacts of multiple relays in series, failure rate is lowered, and reliability is further improved; in addition, with the design of connecting the free-wheeling diode to the output end of the rectifying unit in parallel, the safety of the whole brake control circuit is ensured. Further, double protection is achieved for main circuit and control circuit in the motor brake control circuit, so as to achieve high reliability.

BRIEF DESCRIPTION OF THE DRAWINGS

The accompanying drawings, as a part of the description, are used to provide a further understanding of the present invention, and to explain the present invention in conjunction with the specific implementations as below, instead of limiting the present invention.

Figure 1:
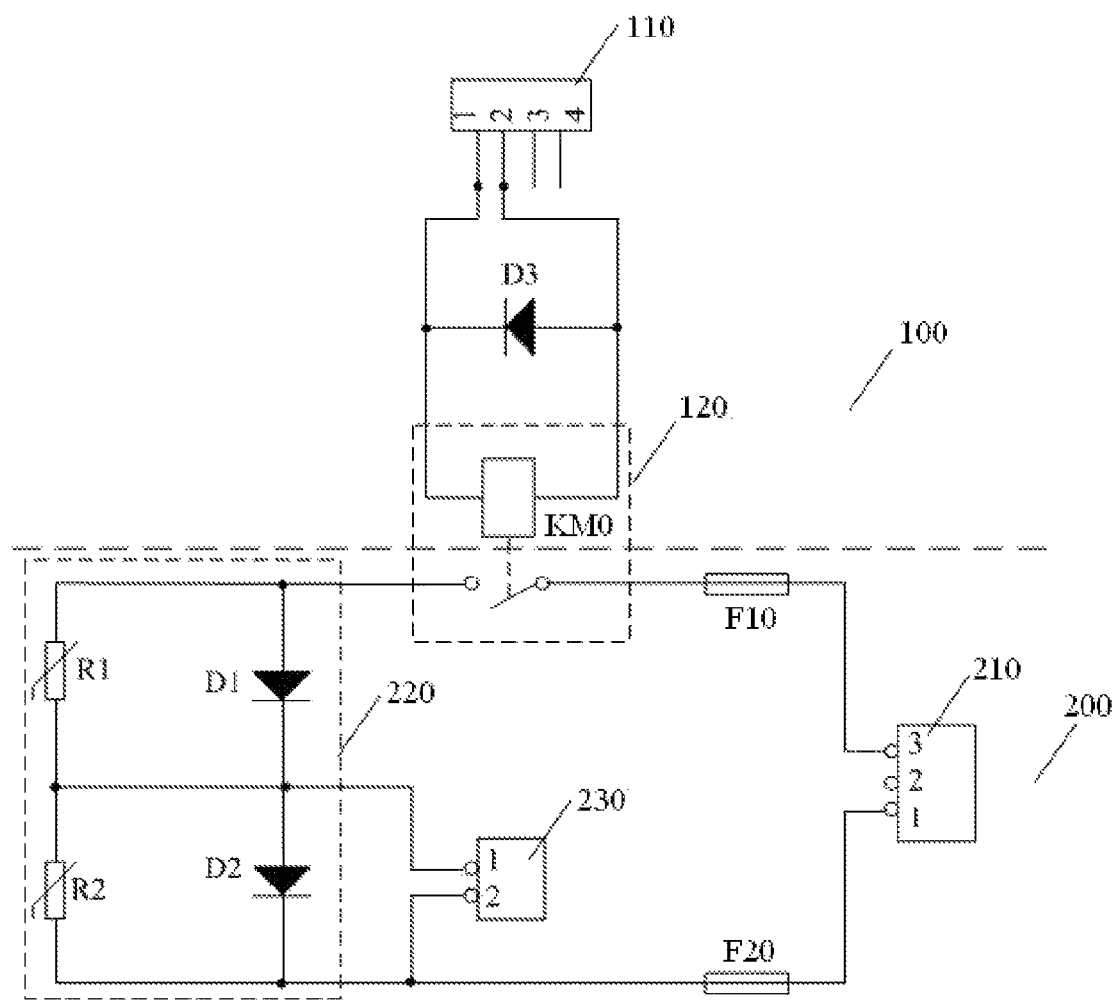
FIG. 1 is a schematic diagram illustrating a brake control circuit in the prior art.

REFERENCE NUMERALS 1, 100—brake control input module; 11, 110—control signal input unit; 12a, 12b, 120—relay; KM0, KM1, KM2—coil and contacts of relay; 2, 200—brake control main module; 21, 210—power input unit; 22, 220—rectifying unit; 23, 230—brake control output unit; F1, F2, F10, F 20—fuse; D3, D4, D5, D6—free-wheeling diode.

DETAILED DESCRIPTION OF THE EMBODIMENTS

To give a better understanding of technical solutions of the present invention for those skilled in the art, a brake control circuit and a motor system of the present invention will be further described in details in conjunction with accompanying drawings and specific implementations.

The present invention provides a brake control circuit for controlling a motor brake connected to a motor, which comprises a brake control input module and a brake control main module. The brake control main module is used to control the motor brake to start or stop under the control of the brake control input module. The brake control input module includes a control signal input unit and N (N is an integer greater than or equal to 2) relays connected in parallel to an output end of the control signal input unit. The control signal input unit is used to collect a power-off signal or receive an emergency stop signal, generate a brake control signal according to the collected power-off signal or the input emergency stop signal, and transmit the generated brake control signal to the relays. The relays are electrically connected to the brake control main module, and are used to control an output of the brake control main module according to the brake control signal received from the control signal input unit.

The present invention further provides a motor system, comprising a motor, a motor brake connected to the motor, and a brake control circuit for controlling the motor brake, wherein, the brake control circuit is the above-described brake control circuit.

Embodiment 1

Figure 2:
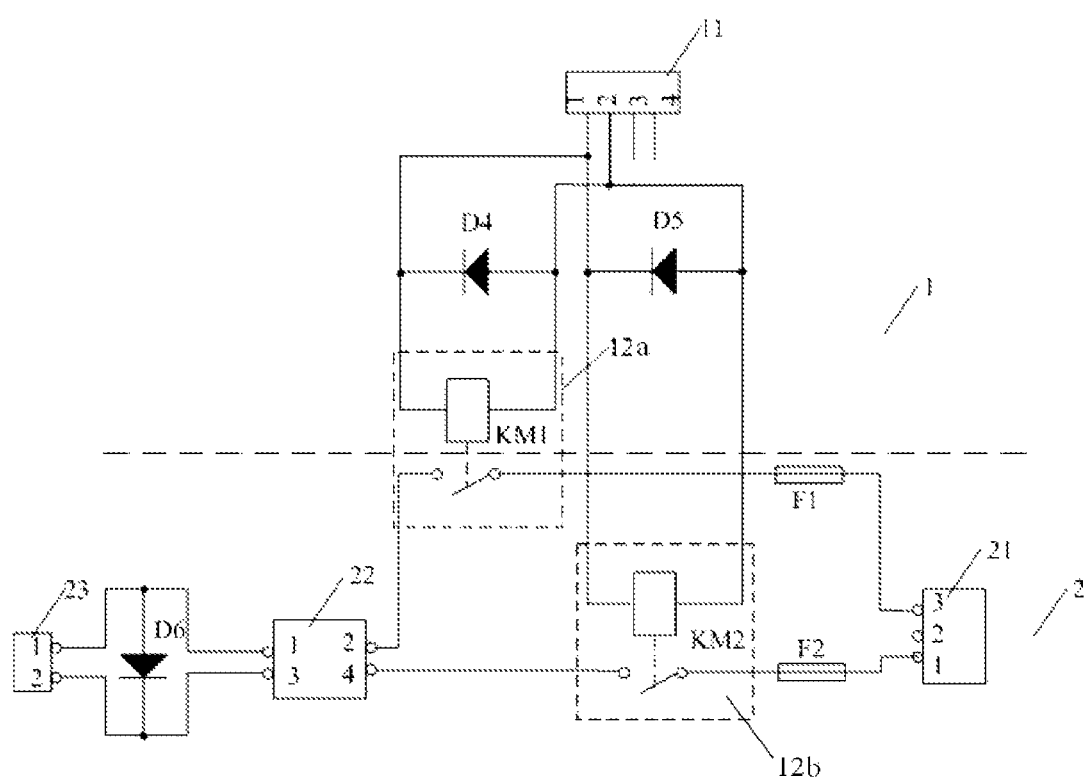
FIG. 2 is a schematic diagram illustrating a brake control circuit in Embodiment 1 of the present invention.

The present invention provides a brake control circuit for controlling a motor brake connected to a motor. As shown in FIG. 2, the brake control circuit comprises a brake control input module 1 and a brake control main module 2. The brake control main module 2 is used to control the motor brake (not shown in FIG. 2) to start or stop under the control of the brake control input module 1. The brake control input module 1 includes a control signal input unit 11 and N (N is an integer greater than or equal to 2) relays 12a, 12b, . . . (hereinafter, for convenience, these relays are collectively referred to as "relays 12" when there is no need to differentiate respective relays) connected in parallel to an output end of the control signal input unit 11. The control signal input unit 11 is used to collect a power-off signal or receive an emergency stop signal, generate a brake control signal according to the collected power-off signal or the input emergency stop signal, and transmit the generated brake control signal to the relays 12. The relays 12 are electrically connected to the brake control main module 2, and are used to control the output of the brake control main module 2 according to the brake control signal received from the control signal input unit 11.

Specifically, as shown in FIG. 2, the brake control main module 2 includes a power input unit 21, a rectifying unit 22, and a brake control output unit 23, which are electrically connected in sequence. The output end of the brake control output unit 23 is electrically connected to the input end of the motor brake. Here, coils KM1, KM2, . . . of N relays 12 (hereinafter, for convenience, these coils are collectively referred to as "coils KM" when there is no need to differentiate respective coils, and the same applies to contacts of N relays) are connected in parallel to the output end of the control signal input unit 11, contacts KM of N relays 12 are connected in series between the power input unit 21 and the rectifying unit 22, and contacts KM of at least one relay 12 are provided at each of positive output end and negative output end of the power input unit 21. For example, as shown in FIG. 2, contacts KM1 of at least one relay 12a are provided at the positive output end of the power input unit 21, and contacts KM2 of at least one relay 12b are provided at the negative output end of the power input unit 21.

Here, it should be understood that, according to the rules of circuit design, the coils of relays are provided in a control loop through which a smaller current flows (i.e. the brake control input module 1), and the contacts of relays are provided in the brake control main module through which a larger current flows. Meanwhile, the depiction of electronic components in a circuit schematic diagram does not typically indicate spatial positions, different components of the same electronic device may not be drawn together in the diagrams, but their reference numbers should maintain consistent. For example, in the drawing (FIG. 2) corresponding to this embodiment, the coil and the contacts of the relay 12a (or 12b) are not drawn together, but the same reference number KM1 (or KM2) is used to denote the coil and contacts of the relay 12a (or 12b).

Here, the motor brake (not shown in FIG. 2), also called electromagnetic brake, is typically an electromagnetic lock device provided at the tail of a motor. The motor brake is switched on when the motor is switched on, and at this time, the motor brake does not brake the motor. The motor brake is powered off when the motor is powered off, and a band brake stops the motor. The brake control circuit of the present embodiment is a circuit controlling the motor brake. In the brake control circuit, a power-off signal is collected or an emergency stop signal is input at the input end of the control signal input unit 11, and the output end of the brake control input unit 23 is electrically connected to the input end of the motor brake. Specifically, the input end of the control signal input unit 11 is used to introduce external control signal (i.e. the power-off signal or the emergency stop signal), and the brake control signal (effective at a low level) is output from the output end (e.g. terminals 1, 2) of the control signal input unit 11; in the case of no external control signal (i.e. normal operation), a control signal voltage (typically, 24V) is supplied from the output end of the control signal input unit 11. The power input unit 21 introduces a power signal for the rectifying unit 22, and the power signal is output from the output end of the brake control output unit 23 to the input end of the motor brake after rectified by the rectifying unit 22.

In the brake control circuit of the prior art, when braking is in need, it is possible that the commonly open contacts of the relay 12 cannot be open promptly or all along, which disables the maintaining voltage at the brake control output unit 230 from disconnecting, and causes malfunction of the motor brake, and as a result, the motor cannot be locked. The brake control circuit of the present invention can avoid occurrence of the above situations. In the present embodiment, a case in which N equals 2 is taken as an example. As shown in FIG. 2, coils of the two relays 12a, 12b (i.e. coils KM1 and KM2 shown in FIG. 12) are connected in parallel, and contacts of the two relays 12a, 12b are connected in series between the power input unit 21 and the rectifying unit 22. In this way, compared with the prior art, a second relay 12b with the same function as a first relay 12a is additionally provided, the coil KM2 of the second relay 12b is connected with the coil KM1 of the first relay 12a in parallel, and the contacts KM2 of the second relay 12b and the contacts KM1 of the first relay 12a are connected in the main circuit in series. When one of the second relay 12b and the first relay 12a fails, the other relay can still operate normally; besides, when any one of the contacts of the relays in the main circuit is open, the whole main circuit can be cut off, so as to activate the motor brake.

Contacts of relays include commonly open contacts and commonly closed contacts. Contacts, which are open in a static state without external force, are referred to as commonly open contacts. On the contrary, Contacts, which are closed in a static state without external force, are referred to as commonly closed contacts. In the present invention, the contacts of both the first relay 12a and the second relay 12b are commonly open contacts. Preferably, the two relays 12 in the brake control circuit of the present embodiment are of the same type.

To further guarantee the safety of the brake control circuit, a free-wheeling diode D6 is further connected between the output end of the rectifying unit 22 and the input end of the brake control output unit 23 in parallel. In this way, when a surge current occurs due to abnormal operation in the motor brake, charges can be discharged through a circuit loop formed by the free-wheeling diode D6 so that other components in the brake control circuit will not be burned out.

Meanwhile, to ensure safety of the relays 12, a free-wheeling diode is connected to each of the relays 12 in parallel, such as a free-wheeling diode D4 connected in parallel to the first relay 12a and a free-wheeling diode D5 connected in parallel to the second relay 12b. In the brake control main module 2, fuses are provided both between the positive output end of the power input unit 21 and the contacts of the relay 12a and between the negative output end of the power input unit 21 and the contacts of the relay 12b, that is, the fuse F1 and fuse F2 are connected in series between the power input unit 21 and the rectifying unit 22.

In the brake control circuit of the prior art, when aging, damage or failure happens to one of the components in the rectifying unit 22, the brake control output unit 230 cannot output the maintaining voltage, as a result of which, the motor brake is mistakenly activated. To avoid the above situations, for the rectifying unit 22 in the present embodiment, a plug-in modular design may be adopted. For example, a rectifying module of model MH-23 may be selected as the rectifying unit 22. In this case, an AC power signal ranging from 200 to 220V is input to the rectifying module of model MH-23 through its input end, and a DC power signal ranging from 90 to 115V is output from the rectifying module of model MH-23 through its output end, so as to provide a voltage required for braking to the motor brake. With the plug-in modular design for the rectifying unit, not only can the DC voltage required for locking the motor brake be reliably output, but also the plug-in design makes replacement of the rectifying unit convenient when the rectifying unit fails, which, compared to the case that the whole brake control board is replaced, further lowers the cost, and reduces downtime caused by the replacement.

During operation of the brake control circuit of the present embodiment, when an emergency stop button is pressed, the coils of the first and second relays in the brake control input module 1 are powered off simultaneously, the commonly open contacts of the first and second relays are open, and the motor stops operating and is locked by the motor brake so as to prevent the motor from dropping out. Controlling the motor brake to lock the motor promptly and accurately is quite important to the motor in vertical direction.

To save circuit board area of the brake control circuit, it is preferable for the brake control circuit to adopt bilayer wiring design, so as to improve the reliability of the circuit. Specifically, for example, pins of the rectifying unit and the free-wheeling diodes are provided on the upper layer of a printed circuit board, and pins of the fuses are provided on the lower layer of the printed circuit board. Besides, to increase line current, line width may be made wider accordingly.

Compared to the prior art, the brake control circuit of the present embodiment can decrease failure rate of brake control circuit to second power of that of the prior art. Assume that the failure rate of a relay is X ($0<X<1$), then the failure rate of the brake control circuit illustrated in the present embodiment is $X^2$.

Here, it should be understood that, the rectifying unit in the brake control circuit of the present invention is not limited to the rectifying module of the above model, and any model of rectifying module can be used as long as the rectifying module can reliably output a DC voltage with a desired magnitude in the manner shown in FIG. 2 and be easy to exchange. Moreover, types of the relays, models of the related components, connections among modules or units, and installation of the circuit board are not limited to the above descriptions, as long as the brake control circuit can control the motor brake reliably according to the input signal in the manner shown in FIG. 2.

In the brake control circuit of the present embodiment, with the modular design for the rectifying unit, not only is reliability improved, but also replacement is facilitated; with the design of connecting the coils of two relays in parallel and connecting the contacts of two relays in series, failure rate is lowered and reliability is further improved; in addition, with the design of connecting the free-wheeling diode at the output end of the rectifying unit in parallel, the safety of the whole brake control circuit is ensured. Further, double protection is achieved for main circuit and control circuit in the motor brake control circuit, so as to achieve high reliability.

Embodiment 2

The present embodiment provides a brake control circuit, and compared to the brake control circuit in Embodiment 1, the number N of the relays is greater than or equal to 3 in the brake control circuit of the present embodiment.

Similar to Embodiment 1, coils of N relays are connected in parallel to the output end of the control signal input unit 11, and contacts of N relays are connected in series between the power input unit 21 and the rectifying unit 22. Similarly, the N relays preferably have the same model and bilayer wiring design is adopted for the brake control circuit.

In the present embodiment, with multi-protection provided by relays, the failure rate of the brake control circuit becomes (N+1)-th power of the failure rate (which is X) of a relay, that is, $X^{N+1}$. In other words, the failure rate of the brake control circuit decreases as the number of relays increases; however, the cost of the brake control circuit increases with the increasing number of relays. Therefore, overall consideration should be given to advantages and disadvantages of control effect and cost so as to select a reasonable number of relay.

Other circuit configurations of the brake control circuit in the present embodiment are the same as those in Embodiment 1, and will not be described herein.

The brake control circuits in Embodiments 1 and 2, compared to the brake control circuit in the prior art, have the design of connecting coils of a plurality of relays in parallel and connecting contacts of the plurality of relays in series. As a result, the reliability of braking the motor can be ensured effectively and the possibility of failing to brake the motor is greatly reduced, as long as the motor brake operates normally and the N relays do not break down simultaneously.

Embodiment 3

The present embodiment provides a motor system, comprising a motor, a motor brake connected to the motor and a brake control circuit for controlling the motor brake, wherein, the brake control circuit is the brake control circuit in Embodiment 1 or Embodiment 2.

The brake control circuit is adapted to drive the motors used for respective shafts of robots and robotic arms used in various industries such as TFT-LCD display, automobile, and the like. Meanwhile, the application of the brake control circuit may extend to other motor systems including a motor brake with the function of a band brake.

The motor system of the present embodiment, due to its brake control circuit with high reliability, can ensure stable operation of a device, avoids harm to human body due to mistaken braking of the motor, reduces loss brought to the device and production, and saves device maintenance cost spent in the process of device maintenance.

It can be understood that the above implementations are merely used for explaining the principle of the present invention, but the present invention is not limited thereto. For those skilled in the art, various modifications and improvements may be made without departing from the spirit and essence of the present invention, and these modifications and improvements are also deemed as the protection scope of the present invention.

The invention claimed is:

1. A brake control circuit for controlling a motor brake connected to a motor, which comprises a brake control input module and a brake control main module used to control the motor brake to start or stop under the control of the brake control input module, wherein the brake control input module includes a control signal input unit and N relays connected in parallel to an output end of the control signal input unit, the control signal input unit is used to collect a power-off signal or receive an emergency stop signal, generate a brake control signal according to the collected power-off signal or the input emergency stop signal, and transmit the generated brake control signal to the relays, the relays are electrically connected to the brake control main module, and are used to control an output of the brake control main module according to the brake control signal received from the control signal input unit, and N is an integer greater than or equal to 2.

2. The brake control circuit according to claim 1, wherein the brake control main module comprises a power input unit, a rectifying unit and a brake control output unit which are electrically connected in sequence, an output end of the brake control output unit is electrically connected to an input end of the motor brake, and coils of the N relays are connected in parallel to the output end of the control signal input unit, and contacts of the N relays are connected in series between the power input unit and the rectifying unit.

3. The brake control circuit according to claim 2, wherein contacts of at least one relay are provided at each of a positive output end and a negative output end of the power input unit.

4. The brake control circuit according to claim 3, wherein a fuse is provided between each of the positive output end and the negative output end of the power input unit and the contacts of the relay.

5. The brake control circuit according to claim 2, wherein the contacts of the relay are commonly open contacts.

6. The brake control circuit according to claim 2, wherein a free-wheeling diode is connected in parallel between an output end of the rectifying unit and an input end of the brake control output unit.

7. The brake control circuit according to claim 2, wherein, the rectifying unit is a plug-in module.

8. The brake control circuit according to claim 2, the N relays are of the same type.

9. The brake control circuit according to claim 2, wherein, the brake control circuit adopts a bilayer wiring design.

10. The brake control circuit according to claim 3, the N relays are of the same type.

11. The brake control circuit according to claim 3, wherein, the brake control circuit adopts a bilayer wiring design.

12. The brake control circuit according to claim 7, the N relays are of the same type.

13. The brake control circuit according to claim 7, wherein, the brake control circuit adopts a bilayer wiring design.

14. The brake control circuit according to claim 1, wherein, the N relays are of the same type.

15. The brake control circuit according to claim 1, wherein, the brake control circuit adopts a bilayer wiring design.

16. A motor system, comprising a motor, a motor brake connected to the motor, and a brake control circuit for controlling the motor brake, wherein, the brake control circuit is the brake control circuit according to claim 1.

17. A motor system according to claim 16, wherein the brake control main module comprises a power input unit, a rectifying unit and a brake control output unit which are electrically connected in sequence, an output end of the brake control output unit is electrically connected to an input end of the motor brake, and coils of the N relays are connected in parallel to the output end of the control signal input unit, and contacts of the N relays are connected in series between the power input unit and the rectifying unit.

18. The motor system according to claim 17, wherein contacts of at least one relay are provided at each of a positive output end and a negative output end of the power input unit.

19. The motor system according to claim 17, wherein, the rectifying unit is a plug-in module.

20. The motor system according to claim 16, the brake control circuit adopts a bilayer wiring design.

* * * * *